Jan. 16, 1940. R. F. SCHUTZ 2,187,177
SPECTACLE CASE
Filed Nov. 16, 1938
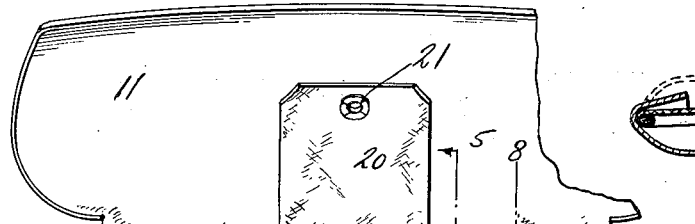
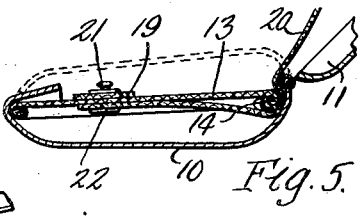
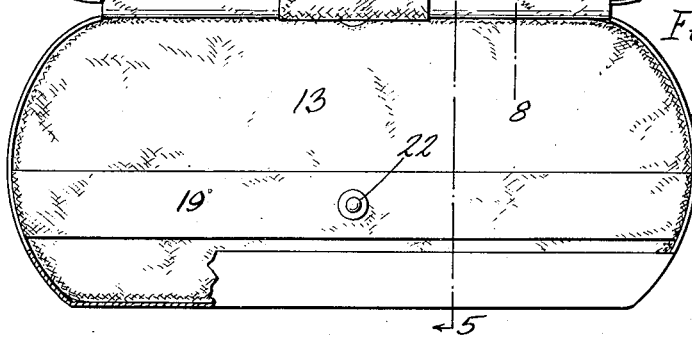
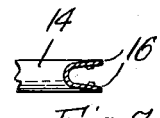
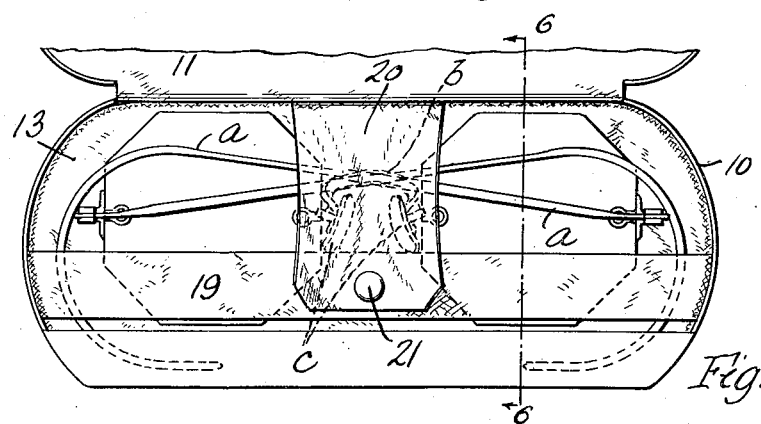
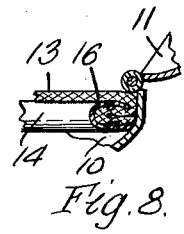
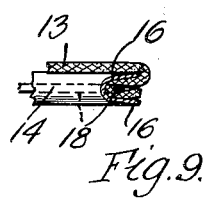
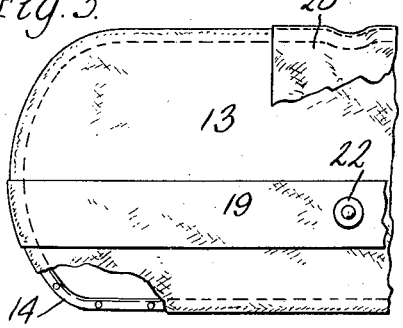
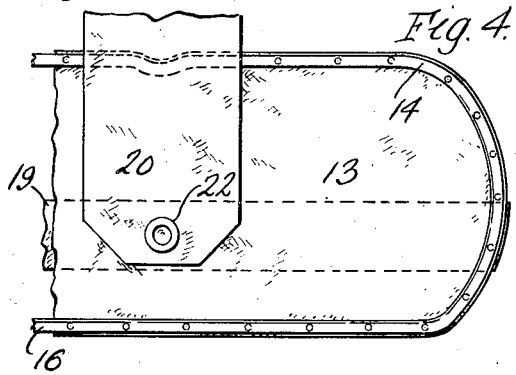
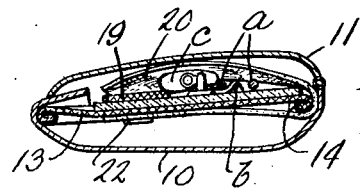
INVENTOR.
Raymond F. Schutz
By Parker, Brockwas & Farmer.
ATTORNEYS.

Patented Jan. 16, 1940

2,187,177

UNITED STATES PATENT OFFICE 2,187,177

SPECTACLE CASE

Raymond F. Schutz, Buffalo, N. Y.

Application November 16, 1938, Serial No. 240,745

11 Claims. (Cl. 206—6)

This invention relates to improvements in pocket or portable cases of the type disclosed in my application for U. S. Letters Patent Serial No. 215,896, filed June 27, 1938, which are used for carrying and protecting eyeglasses or spectacles when not in use, and a primary object of the present invention is to provide such cases with means of improved construction for preventing injury to the eyeglasses or spectacles while in the cases. In this specification the term "spectacles" is employed to designate, not only eyeglasses of the type commonly called spectacles, but also noseglasses or other eyeglasses, except where the context makes it clear that spectacles equipped with side bows or members for retaining them in place on the wearer are intended.

It is well known that spectacles are frequently broken or damaged while in their carrying cases because, due to dropping, careless handling or knocking of the cases against objects, the spectacles are subjected to injurious jars or impacts against the walls or parts of the cases which may be made of metal or relatively rigid material.

My above mentioned application discloses a case in which the spectacles are resiliently supported between strips or pieces of flexible or elastic sheet material that hold them away from or out of contact with the walls of the case and prevent injurious sidewise or edgewise impact of the lenses with said walls or other rigid parts of the case in the event of the case being dropped or subjected to jar or shock that otherwise might injure the spectacles.

As disclosed in said application, at least one of the flexible or elastic strips or pieces between which the spectacles are held is stretched across the interior of the case and held under tension between and out of contact with the walls or other rigid parts of the case so as to yieldingly or resiliently support or suspend the spectacles in the case out of contact with its walls or other rigid parts.

Other objects of this invention are to arrange and mount the flexible or elastic suspension web or pieces for the spectacles in a novel manner so as to facilitate the mounting of the same in the case and improve the appearance and efficiency of the case; also to provide a spectacle case which has the other features of advantage and improvement hereinafter described and set forth in the claims.

The accompany drawing illustrates slightly different embodiments of my improvements.

Fig. 1 is a front or plan view of a spectacles case embodying my invention, showing the same open and with parts broken away.

Fig. 2 is a view thereof showing the spectacles fastened in place in the case.

Figs. 3 and 4 are respectively front and back views of the opposite end portions of the web and its mounting frame unit removed from the case.

Fig. 5 is a transverse section of the case on line 5—5, Fig. 1.

Fig. 6 is a transverse section of the closed case with the spectacles therein, on the plane of line 6—6, Fig. 2.

Fig. 7 is a detail cross section of the channel strip forming the web mounting frame.

Fig. 8 is an enlarged section on line 8—8, Fig. 1.

Fig. 9 is an enlarged section showing a slightly different way of attaching the web to its frame.

10 represents a spectacles case which may be of known construction, the case shown comprising a hollow body formed with front, rear and end walls and a hinged cover or lid 11, which may be releasably held in closed position by the usual lid spring or other closing or securing means (not shown). The case may be made of sheet metal or other suitable relatively stiff or rigid material, and, as usual, may be covered exteriorly and lined interiorly with suitable finishing material or fabric (not shown).

A web or piece 13 of suitable flexible and preferably more or less elastic sheet material, such for example as thin leather, chamois skin, kid, velvet or elastic webbing, is stretched across the cavity of the body of the case or held taut or under tension therein in a position spaced away from or out of contact with the bottom and top wall or lid of the case, so as to form, in effect, a resilient or yielding diaphragm in the case on which the spectacles may lie and be yieldingly supported or suspended in the case out of contact with the rigid parts thereof. This piece or web 13 is preferably mounted and held under tension in the case by stretching and attaching the web on an open frame 14 or analogous mounting element which conforms substantially in shape to the interior peripheral shape of the body of the case, and then securing this frame, with the attached web in place thereon in the case. By this construction, the flexible web can be stretched and fastened on the frame while out of the case, and the frame with its attached web then placed and secured as a unit in the case. The frame 14 may consist, for instance, of an endless hoop or band of metal or other suitable material having sufficient resilience to adapt it to be sprung into place in the body of the case beneath inbent or overhanging rim portions of the case body and be retained in place therein by the tendency of the frame to spring or expand into contact with the surrounding portions of the walls of the body.

The flexible web 13 may be attached at its edges to its supporting frame 14 in any suitable manner so as to securely fasten the web to the frame with the web held stretched or under tension across the space bounded by the frame. For instance, as shown in Figs. 5–8, the frame 14 consists of a slender, light hoop formed of a spring metal strip of channel shape in cross section with the flanges 16 of the channel directed outwardly, and the web is stretched across one side of this frame, with its edges secured in the channel of the hoop by squeezing or closing the hoop flanges together so as to grip and hold the edges of the web. Small holes may be punched inwardly through the hoop flanges at intervals, thus forming burrs or projections on the inner faces of the flanges which will aid in securely holding the edges of the web.

The edges of the flexible web could however be fastened on the frame or hoop by means of a wire or cord 18 encircling the hoop and drawn tight in the channel thereof over the edges of the web so as to clamp and securely hold the edges in the hoop channel, as shown in Fig. 9.

Any other suitable way or means for fastening the edges of the web or material to the frame or hoop could be employed. For instance, the edges could be cemented to the frame or hoop or could be held thereon between the hoop 14 and a surrounding securing hoop pressed over the inner supporting hoop so as to clamp the edges of the web between the two hoops.

For holding the spectacles down on or against this resilient web 13 away from the top of the case, an upper flexible strip or band 19 is shown, which may be made of material like the web and extends lengthwise of the case over the web 13 with the ends of the band 19 secured to the end portions of the web or its supporting frame and the band fastened approximately midway between its ends to the web 13. The band 19 thus arranged, provides two loops or pockets into which the two lenses and ends of the bows $a$ of the spectacles are adapted to be inserted, and the band 19 is sufficiently taut to hold the lenses against the web and prevent them from being thrown against the case lid. The ends of the band 19 may be fastened to the frame 14 in the same way that the web is fastened, or they may be secured in any other suitable way.

The spectacles may be laid in the case on the web 13 with the lower portions of the lenses inserted forwardly in said pockets between the web and overlying band 19, and may be prevented from possible unintentional dislodgment from the pockets and from shifting edgewise in the case by suitable means, such as a holding member or flap 20 which preferably extends from the rear portion of the case forwardly over the bridge $b$ of the spectacles and is releasably held or fastened down against the nose rests or pieces $c$ of the spectacles. As shown, this holding member 20 is formed by a piece of flexible material, for example, a piece of elastic webbing, which is secured at one end to the underside of the web 13, extends forwardly over the rear edge of the web frame 14 and is provided at its free end portion with a member 21 of a releasable fastener, the other member 22 of which may be secured to the web 13. A stud and socket snap fastener is shown for this purpose, the stud member 22 thereof being attached through the band 19, web 13 and inner end of the member 20, so as to secure these three parts together.

The spectacles placed and secured as explained, between the web strip 13 and cover flap 20 are suspended or resiliently supported out of contact with the bottom wall of the case, and also, with the exception of the ends of the spring bows, out of contact with the front, rear and end walls of the case, so that the lenses or other parts of the spectacles which are liable to injury, are held from contact with or striking against these walls or other rigid parts of the case. Since the holding member 20 is folded forwardly over the bridge or upper edge portions of the spectacles and secured, and the curved ends of the bows of the spectacles, which are resilient, bear against the front wall of the case, the lenses are resiliently held in place edgewise and prevented from contact with the front and rear walls or parts of the case.

I claim as my invention:

1. A case for spectacles comprising a body and lid, a web of flexible sheet material secured at its opposite side and end marginal edges in the case at corresponding peripheral portions of the case and stretched across the case with the web held under tension spaced away from both the bottom and top walls of the case, said web forming a resilient diaphragm-like support on which the spectacles lie and are yieldingly supported, and means for confining the spectacles on said web with the lenses out of contact with the walls of the case.

2. A case for spectacles comprising a body and lid, a web of flexible sheet material secured at its opposite side and end marginal edges in the case and stretched across the case with the web held under tension, spaced away from both the bottom and top walls of the case, said web forming a resilient diaphragm-like support on which the spectacles lie, a flexible band arranged over said web and holding the spectacles against the web, and means for confining the spectacles against shifting edgewise in the case.

3. A case for spectacles comprising a body and lid, an open frame retained in the case at the inner peripheral portions thereof, a web of flexible sheet material attached to said frame and stretched across the frame with the web held under tension spaced away from both the bottom and top walls of the case, said web forming a resilient diaphragm-like support on which the spectacles lie, and means for confining the spectacles on said web with the lenses out of contact with the walls of the case.

4. A case for spectacles comprising a body and lid, an open resilient frame retained by its resilience in the case at the inner peripheral portions thereof, a web of flexible sheet material attached at its marginal edges to said frame and stretched across the frame with the web held under tension spaced away from both the bottom and top walls of the case, said web forming a resilient diaphragm-like support on which the spectacles lie, and means for confining the spectacles on said web with the lenses out of contact with the walls of the case.

5. A case for spectacles comprising a body and lid, an open frame retained in the case at the inner peripheral portions thereof, a web of flexible sheet material attached at its marginal edges to said frame and stretched across the frame with the web held under tension spaced away from both the bottom and top walls of the case, said web forming a resilient diaphragm-like support on which the spectacles lie, a flexible band arranged over said web and holding the spectacles against the web, and means for confining the spectacles against edgewise shifting between the web and band.

6. A case for spectacles comprising a body and lid, an open frame retained in the case at the inner peripheral portions thereof, a web of flexible sheet material attached at its marginal edges to said frame and stretched across the frame with the web held under tension spaced away from both the bottom and top walls of the case, said web forming a resilient diaphragm-like support on which the spectacles lie, and a holding member extending forwardly from the rear portion of the case over the bridge of the spectacles and releasably fastened down between the lenses of the spectacles.

7. A case for spectacles comprising a body and lid, an open frame retained in the case at the inner peripheral portions thereof, a web of flexible sheet material attached at its marginal edges to said frame and stretched across the frame with the web held under tension spaced away from both the bottom and top walls of the case, said web forming a resilient diaphragm-like support on which the spectacles lie, a flexible band arranged over said web and holding the spectacles against the web, and a holding member carried by said frame and passing over the bridge of the spectacles and releasably fastened down between the lenses of the spectacles.

8. A case for spectacles comprising a body and lid, an open frame retained in the case at the inner peripheral portions thereof, a web of flexible sheet material attached at its marginal edges to said frame and stretched across the frame with the web held under tension spaced away from both the bottom and top walls of the case, said web forming a resilient diaphragm-like support on which the spectacles lie, a flexible band arranged over said web and holding the spectacles against the web, and a flexible member secured to the under side of said web and extending forwardly over the rear edge of said frame and bridge of the spectacles and releasably fastened to said web between the lenses of the spectacles.

9. A case for spectacles comprising a body and a lid, an open frame having a peripheral channel in its outer edge and retained in the case body at the inner peripheral portions thereof, a web of flexible sheet material having its marginal edges secured in the channel of said frame and stretched across the frame with the web held under tension spaced away from both the bottom and top walls of the case, said web forming a resilient diaphragm-like support on which the spectacles lie, and means for confining the spectacles on said web with the lenses out of contact with the walls of the case.

10. A unit for use in a spectacles case for resiliently supporting spectacles in the case, said unit comprising an open frame, a web of flexible sheet material attached to said frame and stretched across the opening of the frame with the web held under tension and forming a resilient diaphragm-like support on which the spectacles are adapted to lie, and means supported by said frame for confining the spectacles in place on said web, said unit when secured in the case with said frame at the inner peripheral portions of the case operating to resiliently support the spectacles in the case out of contact with the case walls.

11. A unit for use in a spectacles case for resiliently supporting spectacles in the case, said unit comprising an open frame, a web of flexible sheet material attached at its marginal portions to said frame and stretched across the opening of the frame with the web held under tension and forming a resilient diaphragm-like support on which the spectacles are adapted to lie, a flexible band supported by said frame and arranged over and cooperating with said web for holding the spectacles on the web, said unit when secured in the case with said frame at the inner peripheral portions of the case operating to resiliently support the spectacles in the case out of contact with the case walls.

RAYMOND F. SCHUTZ.